Aug. 22, 1933.  H. T. SEELEY  1,923,754
EXCITATION CONTROL SYSTEM
Filed Sept. 22, 1932
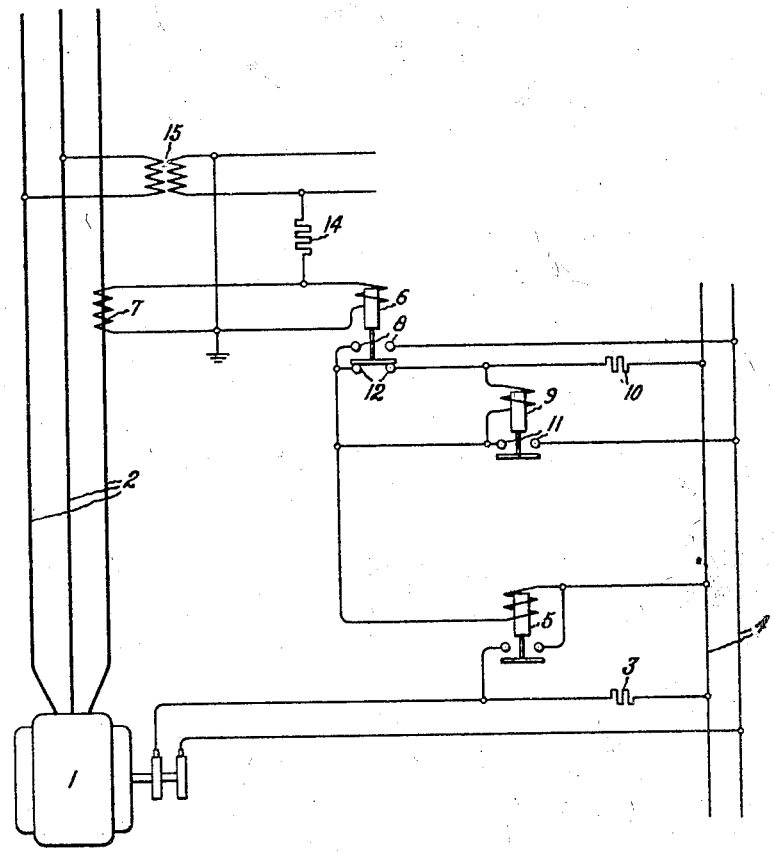
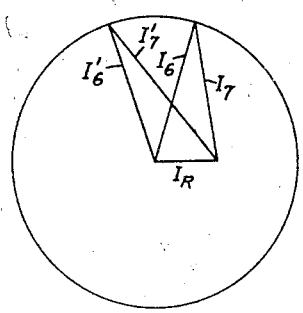
Inventor:
Harold T. Seeley,
by Charles E. Mullen
His Attorney.

Patented Aug. 22, 1933

1,923,754

UNITED STATES PATENT OFFICE 1,923,754

EXCITATION CONTROL SYSTEM

Harold T. Seeley, Lansdowne, Pa., assignor to General Electric Company, a Corporation of New York Application September 22, 1932
Serial No. 634,359

4 Claims. (Cl. 172—274)

My invention relates to excitation control systems and particularly to systems for increasing the excitation of a synchronous machine, such as a synchronous motor, when the load connected thereto exceeds a predetermined value. Heretofore, in such excitation control systems, a relay responsive to the armature current of the synchronous machine has been provided to effect a predetermined increase in the excitation of the machine when the armature current exceeds a predetermined value and to restore the normal excitation when the armature current subsequently decreases to said predetermined value. Such an arrangement, however, is not satisfactory because the increase in the leading current produced by the increase in excitation so increases the total armature current that the current relay does not operate to restore normal excitation until after the load on the machine has decreased to a very much lower value than the value which caused the current relay to increase the excitation.

One object of my invention is to provide a quick-acting arrangement which will overcome this difficulty and will effect the increase and decrease in the excitation of the synchronous machine at substantially the same load.

My invention will be better understood from the following description when taken in connection with the accompanying drawing and its scope will be pointed out in the appended claims.

In the accompanying drawing, Fig. 1 illustrates diagrammatically a synchronous motor excitation control system embodying my invention and Fig. 2 is a vector diagram which is used to explain the invention.

Referring to Fig. 1 of the drawing, 1 represents a synchronous motor, the armature winding of which is connected to a three-phase supply circuit 2. The field winding of the motor 1 and a suitable current limiting device such as the resistor 3 are normally connected in series across a suitable source of excitation 4. In order to increase the excitation of the motor 1 when the load connected thereto exceeds a predetermined value, the resistor 3 is arranged to be short-circuited by a suitable contactor 5. The contactor 5, in turn, is controlled by a current relay 6 which is connected by means of a current transformer 7 so that it is energized in response to the current in one of the phases of the supply circuit 2. When the current through the coil of the relay 6 exceeds a predetermined value, the relay closes its contacts 8 and completes an energizing circuit for the operating coil of the contactor 5 which closes and short-circuits the field resistor 3. The closing of the contacts 8 of the relay 6 also completes a circuit for the operating coil of a control relay 9. The circuit of the relay 9 also includes a resistor 10. The relay 9 by closing its contacts 11 completes a locking circuit for its own operating coil and also a locking circuit for the coil of the contactor 5.

When the current in the winding 6 decreases below a predetermined value, it opens its contacts 8 and closes its contacts 12 which are so connected that they short-circuit the operating winding of the relay 9. Relay 9 then opens its contacts 11 in the locking circuit of the operating coil of contactor 5 which opens and removes the short-circuit from around the resistor 3 so as to restore the excitation of the synchronous motor to its normal value.

In order that the relay 6 may effect the energization and deenergization of the contactor 5 in response to substantially the same value of load, I provide suitable means for controlling the energization thereof so as to compensate for the current change produced in the supply circuit by the change in excitation which occurs when the resistor 3 is short-circuited. When a synchronous motor is driving a predetermined load and the excitation thereof is increased, it is well known that the armature current becomes more leading with respect to the impressed voltage. For example, if prior to the increase in excitation a certain leading current is flowing in the armature circuit, this current is increased and becomes more leading when the excitation is increased. This feature is shown in Fig. 2 of the drawing in which the vector $I_7$ represents the current flowing in the secondary winding of the current transformer 7 for a given motor load when the motor excitation is normal and $I'_7$ represents the current flowing in the current transformer secondary circuit for the same motor load after the field resistor 3 has been short-circuited. It will be noted that the vector $I'_7$ is longer than and leads the vector $I_7$. Due to the fact that the two currents $I_7$ and $I'_7$ are out of phase, it is evident that if a current of the proper phase and magnitude, such as $I_R$, also flows through the winding of the relay 6 in addition to the current transformer secondary current, the resultant current $I_6$ which flows through the relay 6 when the motor excitation is normal for a given motor load is equal in magnitude to the resultant current $I'_6$ for the same motor load when the field resistor 3 is short-circuited. Therefore, with such an arrangement the current relay 6, if designed to close its contacts 8 when the current through its winding exceeds $I_5$ when the motor excitation is normal and to close its contacts 12 when the current through its winding decreases below $I'_7$ when the resistor 3 is short-circuited, will effect the opening and closing of the contactor 5 in response to the same value of motor load.

In order to supply the winding 6 with the proper value of compensating current $I_R$, I connect the winding of relay 6 in Fig. 1 and a suitable impedance, such as a resistor 14, in series across the secondary of a potential transformer 15 the primary of which is connected across one phase of the supply circuit 2. By properly designing the impedance 14, a compensating current of the proper phase and magnitude may be obtained to cause the relay to pick up and drop out in response to the same value of motor load.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an alternating current circuit, a synchronous machine connected to said circuit, and means including a relay having a winding energized in response to the current flowing between said circuit and machine and a compensating winding energized in response to the voltage of said circuit for effecting a predetermined increase in the excitation of said machine above normal when the load on said machine exceeds a predetermined value and for restoring the excitation to the normal value as soon as the load decreases to substantially said predetermined value.

2. In combination, an alternating current circuit, a synchronous machine connected to said circuit, and means for increasing the excitation of said machine a predetermined amount above normal in response to a predetermined load on said machine and for restoring normal excitation as soon as the load on said machine is restored to slightly below said predetermined value including a relay energized in response to the current flowing between said machine and circuit, and means for supplying to said relay a compensating current so that the magnitudes of the resultant currents flowing through said relay for a given load on said machine are substantially the same when the machine excitation is normal and at its increased value.

3. In combination, an alternating current circuit, a synchronous machine connected to said circuit, and means for increasing the excitation of said machine a predetermined amount above normal in response to a predetermined load on said machine and for restoring normal excitation as soon as the load on said machine is restored to slightly below said predetermined value including a relay energized in response to the current flowing between said machine and circuit, and means for supplying from said circuit a constant current of the proper phase and magnitude to cause said relay to pick up and drop out in response to the same value of load.

4. In combination, an alterating current circuit, a synchronous machine connected to said circuit, and means for increasing the excitation of said machine a predetermined amount above normal in response to a predetermined load on said machine and for restoring normal excitation as soon as the load on said machine is restored to slightly below said predetermined value including a current transformer having its primary winding connected to said circuit, a potential transformer having its primary winding connected to said circuit, a relay having a winding connected across the secondaries of said transformer, and an impedance in series with said relay winding and the secondary of said potential transformer.

HAROLD T. SEELEY.